United States Patent [19]
Theodore et al.

[11] 3,842,753
[45] Oct. 22, 1974

[54] SUSPENSION DAMPENING FOR A SURFACE SUPPORT VEHICLE BY MAGNETIC MEANS

[75] Inventors: Charles Theodore, Coronado; James A. Ross, La Jolla, both of Calif.

[73] Assignee: Rohr Industries, Inc., Chula Vista, Calif.

[22] Filed: Aug. 3, 1973

[21] Appl. No.: 385,364

[52] U.S. Cl........ 105/157 R, 105/212, 104/148 MS, 267/182, 308/10
[51] Int. Cl............................................. B61d 1/00
[58] Field of Search........ 105/157 R, 211, 212, 213; 104/148 MS; 308/10, 15; 318/687; 280/106.5 R; 267/182

[56] References Cited
UNITED STATES PATENTS

| | | | |
|---|---|---|---|
| 408,465 | 8/1889 | Dewey.......................... | 104/148 MS |
| 833,635 | 10/1906 | Rogers........................... | 308/10 X |
| 2,954,747 | 10/1960 | Hirst et al...................... | 105/211 X |
| 3,473,852 | 10/1969 | Lyman............................ | 308/10 |

Primary Examiner—M. Henson Wood, Jr.
Assistant Examiner—John J. Love
Attorney, Agent, or Firm—Frank D. Gilliam

[57] ABSTRACT

An improved dampening system for the suspension of a vehicle having a sprung weight supporting portion and an unsprung surface contacting portion. The sprung portion of the vehicle carries spaced apart electro-magnetic force fields, inertial and displacement sensors associated with feedback control means. The unsprung portion carries a ferro-magnetic member placed between the two electro-magnetic members without contact therewith. Suspension means are fixedly connected between the sprung and unsprung portions so as to maintain their average spaced apart position. Any movement between the sprung and unsprung portions from their average spaced apart position is sensed by the sensors. The sensor's signals are applied to the feedback circuit for separately controlling the strength of the force field members so as to maintain their average spaced apart position.

11 Claims, 6 Drawing Figures

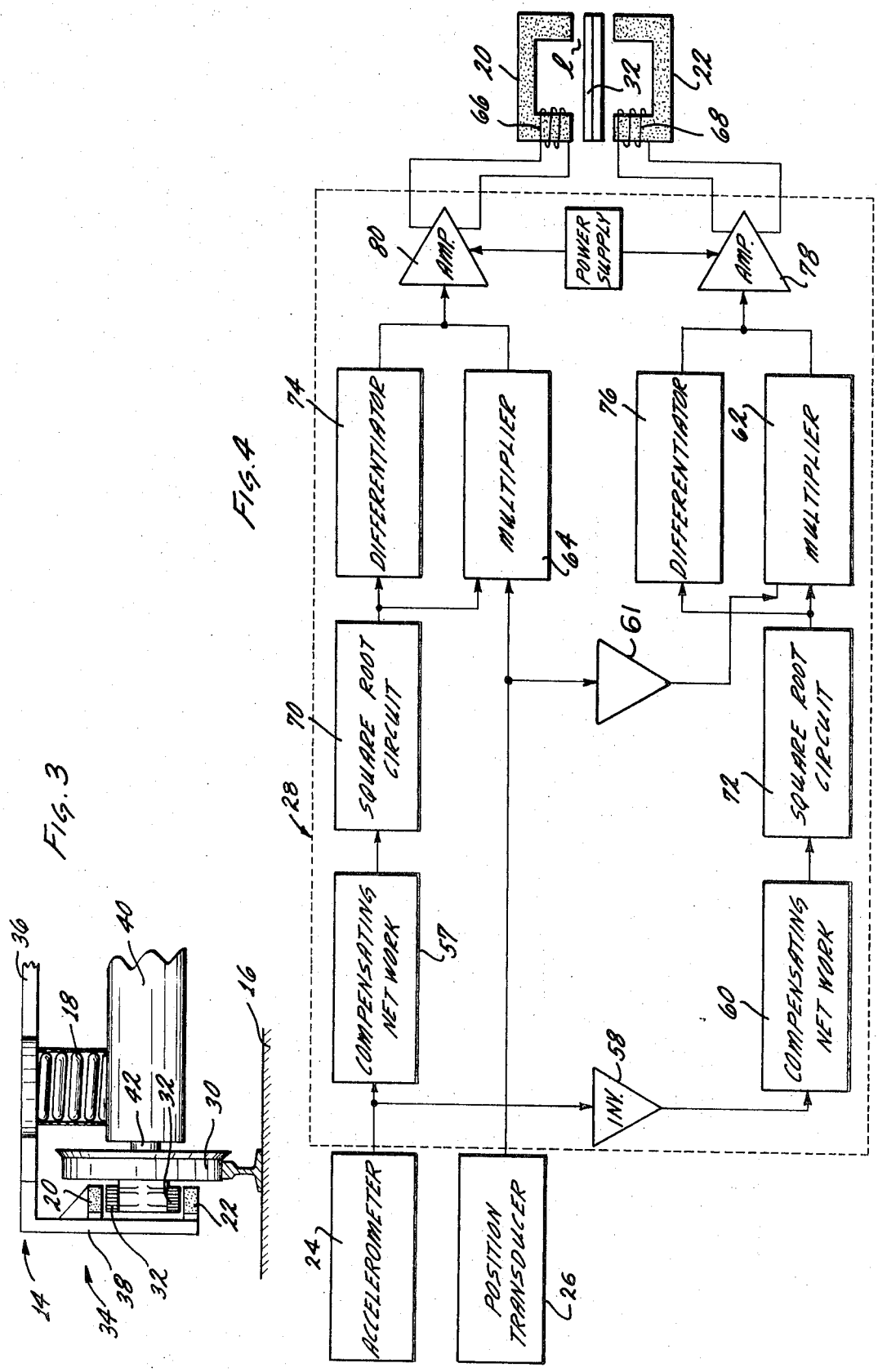

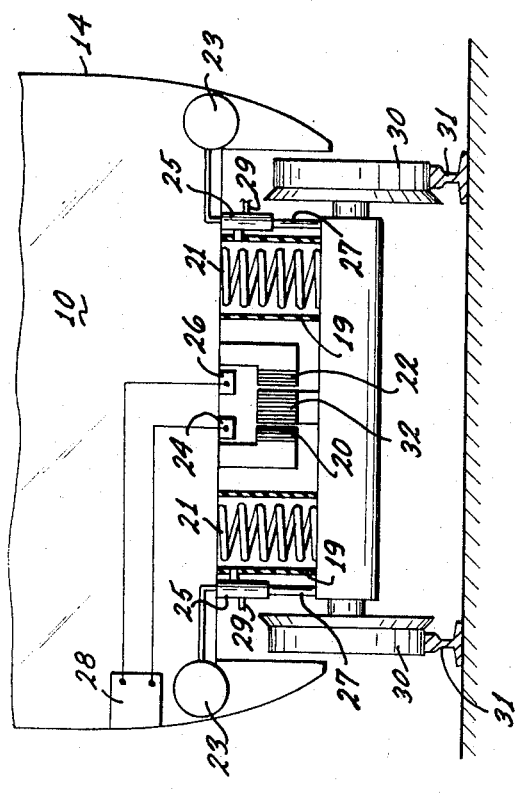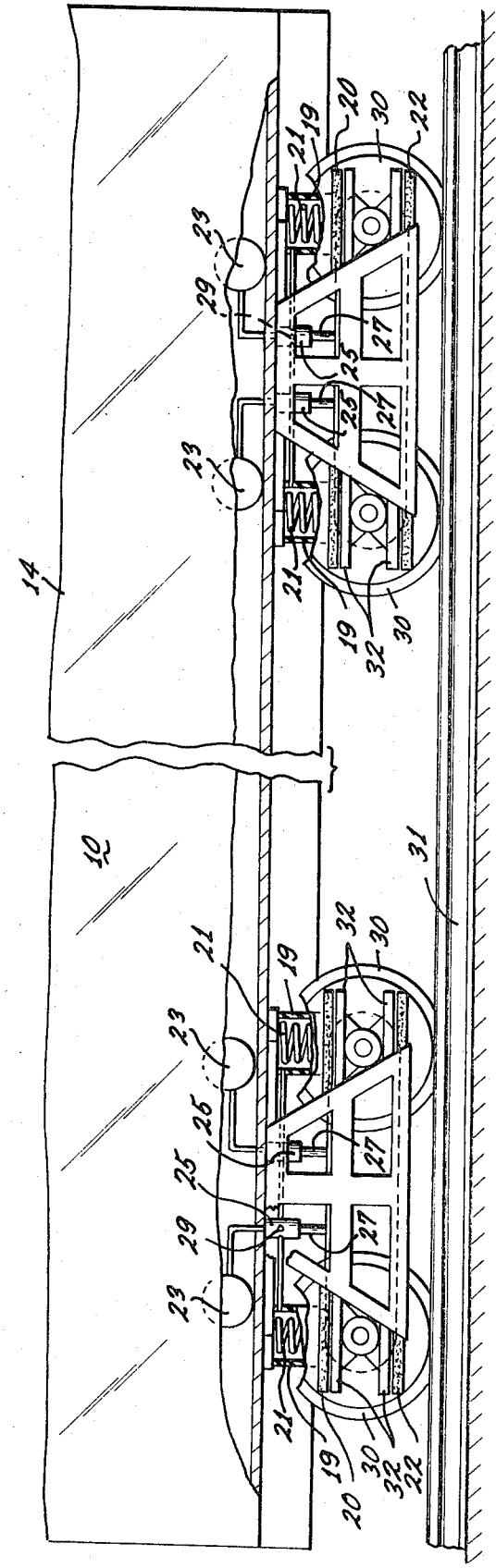

SUSPENSION DAMPENING FOR A SURFACE SUPPORT VEHICLE BY MAGNETIC MEANS

BACKGROUND OF THE INVENTION

This invention pertains generally to improved dampening of oscillations between the sprung and unsprung portions of a vehicle and specifically to dampening by magnetic attractive forces.

In the field of flange wheel solid rail train systems used throughout the world, there has been little change in the art for the past 150 years. Although this basic system concept has been highly successful in the past, limitations which become manifested at high speeds render their use on faster and more comfortable trains impractical and unfeasible. Although flanged wheels are entirely successful for relatively slow speeds of the nineteenth and the first half of the twentieth century, presently required higher speeds, have imposed limitations on this mode of travel since, at such speeds, the skip oscillations or jumping of the wheels along the track occurs which results in a rough and uncomfortable ride. The high speed limitations have not successfully been overcome by currently designed vehicles using prior art suspension systems.

Any form of the present wheeled land transport, whatever its design, has to run over a road bed or be suspended by an overhead suspension system which has a more or less irregular surface. It has been recently realized that the only way to successfully provide ease of ride conditions for the passengers and freight through a range of various vehicle speeds is to be able to control the vehicles suspension properties and in particular the dampening system. A suspension/dampening system proposed for use in a tracked air cushion vehicle uses three layers of suspension separating the passenger compartment from the guideway. The first chassis layer consists of jet air cushions. Second and third layers consist of passive air springs for suspension and active hydraulic elements for dampening. Accelerometer on both chassis and body layers are provided to generate signals when either move from a predetermined position. These signals are fed into an onboard computer to calculate the hydraulic pressure required by the various hydraulic dampening elements to maintain the body along a smooth path.

Various luxury automobiles use similar passive springs for suspension and active hydraulic or pneumatic/hydraulic dampening means working in combination therewith as well as hydraulic/pneumatic means for both suspension and dampening.

Patent Application Ser. No. 251,118 by Ross et al. and assigned to the assignee of the instant invention successfully teaches the use of single attractive magnetic forces to suspend and dampen surface supported transportation vehicles such as trains having support trucks. This system has certain drawbacks which are now apparent. The magnets must be energized at all times even when the vehicle is at stand still to provide the required suspension, thus power must be utilized continually for suspension. The magnets must be of large size for their dual purpose which adds increased weight to the vehicle sprung portion thus reducing the overall payload. The use of a single attractive force field depends on gravity for the balancing force and, therefore, cannot be successfully adapted for use in controlling horizontal movement of the sprung and unsprung portions of a vehicle.

The present invention is directed to providing a structurally superior dampening system which sparingly utilizes electrical energy.

SUMMARY OF THE INVENTION

In accordance with the present invention there is provided a novel magnetic dampening system used in combination with conventional vehicle suspension systems that provide increased payload due to reduced weight, utilizes less power consumption due to its size and the fact that it consumes no power when dampening is not required, provides a more positive control of oscillation between the sprung and unsprung portions of the vehicle by providing plural counteracting magnetic forces and is faster reacting than active hydraulic or hydraulic/pneumatic as taught by the prior art.

These and other features are provided by utilizing an active non-linear feedback control system that provides separate controlled energizing power to spaced apart and opposing magnetic force fields carried by the sprung portion of the vehicle reacting with a non-contacting ferro-magnetic member carried by the unsprung portion and positioned between the magnets. Vehicle suspension of the preferred embodiment is a plurality of resilient pressurized containers including passive coil springs or the like which have means for self regulation of internal pressure with varying loads and an on board pressure source. Passive suspensions of known means may also be utilized.

Dampening of the oscillations between the sprung and unsprung portions is provided by varying the energizing power provided to the magnetic force fields of the magnets in response to inertial and/or position sensing elements having outputs responsive to relative movement of the sprung and unsprung portions of a vehicle and are mounted on the sprung portion and operative by an associated non-linear feedback circuit. The strength of the force fields are thus actively varied through a range of zero to maximum force as required to pull the unsprung portion of the vehicle either away from or toward the sprung portion of the vehicle in order to maintain a relatively stable gap absolute position of the sprung portion regardless of uneven surface conditions encountered by the unsprung surface contacting portion or various forces acting upon the sprung portion.

With the above and other objects, features and advantages of this invention, the same consists in the construction combination and arrangement of parts all as hereinafter more fully described and illustrated.

BRIEF DESCRIPTION OF THE DRAWINGS

FIG. 3 is an elevational view of a fragmentary portion of the truck of FIG. 2.

FIG. 4 is a block diagram of the complete electrical control system comprising the active dampening.

FIG. 5 is a schematic showing of active horizontal vehicle dampening and a pressure source and regulation system for the vehicle suspension.

FIG. 6 shows a tracked vehicle with a pair of trucks employing the instant invention.

DETAILED DESCRIPTION OF THE PREFERRED EMOBIDMENT

Figure 1:
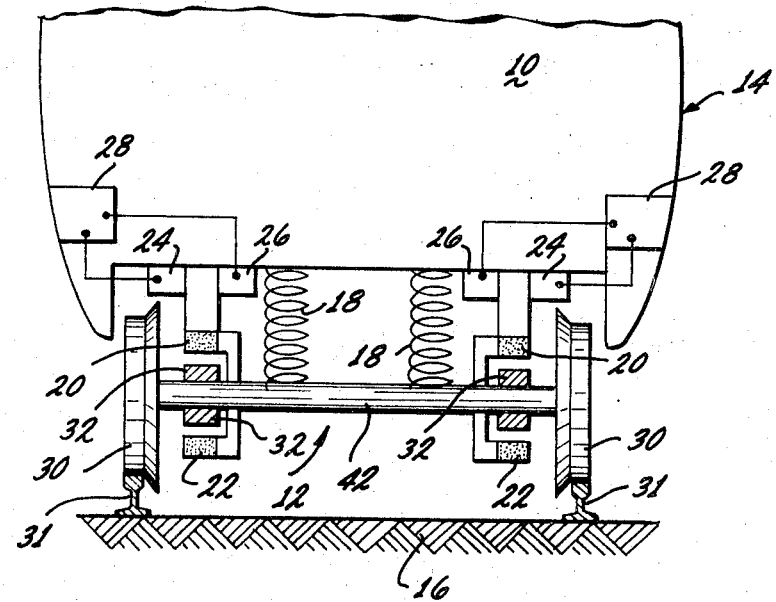
FIG. 1 is a schematic showing of the active dampening and vehicle suspension combination of the present invention.

With specific reference to FIG. 1, a vehicle 10 comprises an unsprung portion 12 and a sprung portion 14, both being disposed over support surface 16. It should be noted that even though the preferred embodiment presented depicts generally a vehicle supported above a supporting surface 16, it should be obvious that the inventive concepts are equally applicable to overhead supported and suspended vehicles as well as any transportation device having sprung and unsprung portions. Vehicle suspension means 18 are shown. To this end any convenient available and suitable means may be utilized in combination with the present invention such as air bag/passive sprung combinations as shown in the preferred embodiment, FIG. 2, hydraulic/pneumatic, hydraulic cylinders or the like. The sprung portion 14 of vehicle 10 carries upper electro-magnetic member 20 and lower magnetic member 22 positioned vertically in line one above the other, accelerometer sensor 24, position transducer 26 and control means 28 for controlling the strength of the electro-magnetic force field of each of the electro-magnets, upper 20 and lower 22. The unsprung portion 12 of vehicle 10 carries the surface support flange wheel members 30 that ride along and are guided by rail 31 and ferro-magnetic member 32 positioned between upper and lower electro-magnets 20 and 22 respectively. The suspension means 18, hereinbefore described, are fixedly attached between sprung portion 14 and unsprung portion 12 as shown. Electrical connection means are shown connecting the various electronic and electrical components. Connections between the control circuit 28, input power, and magnet power amplifier means (not shown) are connected in a conventional manner well known in the electronic art.

Figure 2:
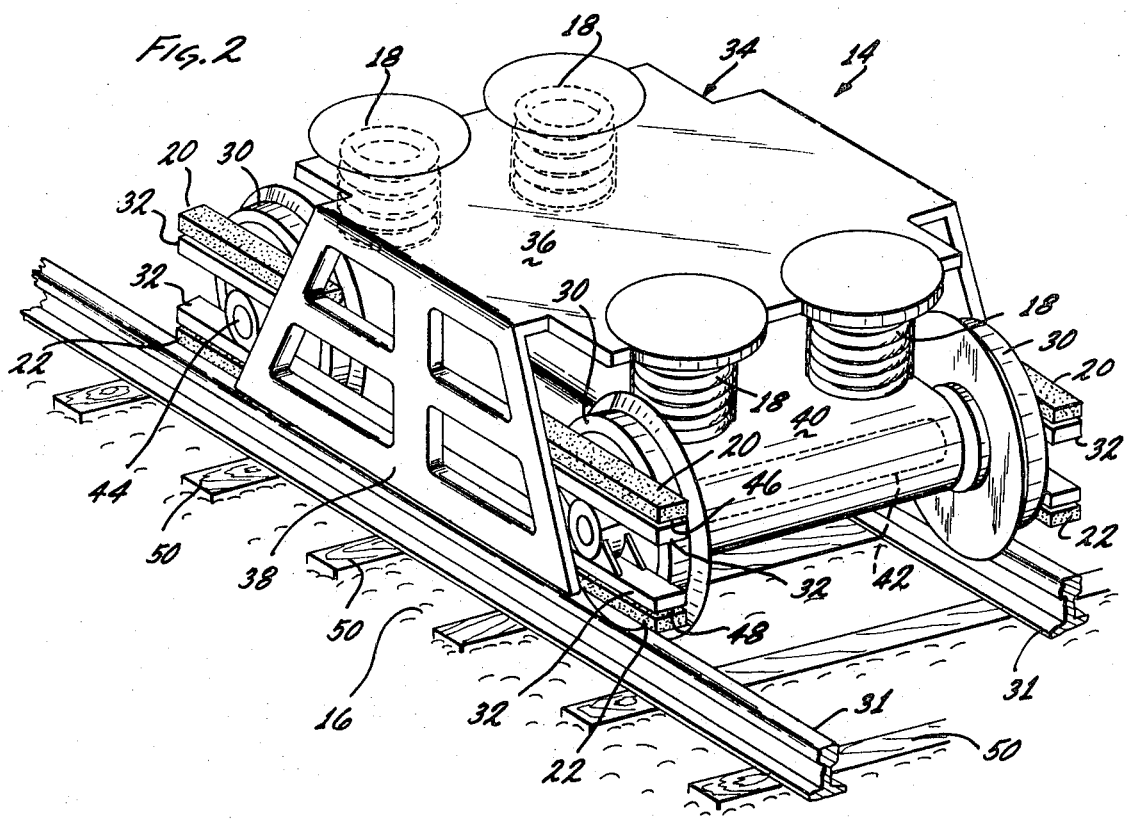
FIG. 2 is a perspective view of a railway truck utilizing the present invention.

Referring now specifically to FIGS. 2 and 3, the invention concept is shown adapted for use with a conventional railway truck 34. The sprung portion 14 is shown with a flat upper platform 36 with the top of four suspension coils 18 having passive coiled springs enclosed by a controllable pressure envelope filled with fluid under pressure. The fluid can be either gas, liquid, or a combination of gas and liquid of the type that has pressure regulators for varying their internal pressure with changes in vehicle loads. The specific details of the pressure system are not shown as they may be conventional in design and the present invention is not limited in application by the particular design utilized. The platform 36 has sides 38 extending downward toward the support surface 16. Each of the sides 38 support a pair of opposing electro-magnetic members on each end thereof, lower electro-magnetic member 22 and upper member 20. The unsprung vehicle portion 14 comprises a support means 40 for attachment of the other end of suspension members 18. The support means 40 supports the axle 42 by conventional, rotatable or fixed support means. On the end of each axle 42 is a hub 44 supporting the ferro-magnetic member 32 shown in FIG. 2 constructed of solid material and in FIG. 3 constructed of side-by-side stacked laminations well known in the transformer art. Ferro-magnetic member 32 has two opposing surfaces, the upper 46 and lower 48 that have an opposed and separated relationship with electro-magnetic member 20 and 22 respectively. The axle 42 has flanged wheel 30 at each end for rolling engagement with rail supports 31. The rails 31 are supported in a conventional manner by transverse support ties 50 resting on road bed 16. The preferred embodiment shown is a trailer type truck having no propulsion means. It should be understood that any conventional propulsion means associated with the combination shown would not change the concepts of the invention.

FIG. 4 is a block diagram of the complete feedback circuit and associated electro-magnetic force fields. It should be noted that the circuit shown in FIG. 4 is typical for each dampening unit required. The preferred embodiment, namely, application to a railway truck as shown by FIG. 2, would use one for each wheel/suspension element combination.

The feedback control and force fields comprise electro-magnets 20 and 22, accelerometer sensor 24, position transducer 26, and the electronic feedback circuit 28. Also shown is ferro-magnetic member 32 carried by the unsprung portion 12. A complete and detailed discussion of each of the specific components of the circuit as well as the magnets and sensors used in this invention can be found in U.S. Pat. No. 3,736,880. The inverter 58 is an operational amplifier and is used for the purpose of inverting the polarity of its input signal. It should be noted that various other feedback circuitry means may be employed to accomplish the same overall control as taught by the referenced U.S. Patent. A summary thereof is presented below.

The accelerometer sensor 24 produces an output signal voltage corresponding to the acceleration of any vertical movement of the sprung portion with respect to the fixed position in free space. The accelerometer output provides an input to both compensating network 57 and compensating network 60 through inverter 58. The compensating networks include an input diode, not shown, to allow only a positive going signal to be applied to their inputs. The positive going output of the accelerometer passes through the compensating network to alter the frequency versus amplitude response. If the output of the accelerometer 24 is positive going compensating network 57 and inverter 58 have a positive voltage at their inputs. A positive voltage at the diode in series with the input to compensating network 57 passes an input signal to the compensating network for normal operation. With a positive signal at the input of inverter 58, the output of the inverter will be negative and thus compensating network 60 will not have an input signal as the negative signal is blocked by its series diode. If the output from the accelerometer is negative the opposite will occur, namely, compensating network 60 will be operative and compensating network 57 will be inoperative.

Position transducer 26 produces an output signal proportional to the distance between electromagnet 20 and ferromagnetic member 32. When the member 32 is equidistant between the two electromagnets 20 and 22, this output signal is one half the maximum level. Amplifier 61 inverts and adds an offset voltage to the position transducer signal so that a signal is available to multiplier 62 proportional to the distance between electromagnet 22 and ferromagnetic member 32.

The attractive forces between electro-magnets 20 and 22 and ferro-magnetic member 32 is proportional to the square of the current passing through the coils 66 and 68 of the electro-magnets. To provide feedback loop stability, the second order function must be linearized by square root circuit 70 and 72 that have an electrical output equivalent to the square root of their respective electrical inputs.

Differentiators 74 and 76 have an output corresponding to the differentiation of their input from the output of their associated square root circuit.

Multipliers 62 and 64 multiply the output from their respective square root circuit with the output of the position transducer 26. The output of the multipliers 62 and 64 are summed with the output of their associated parallel differentiators 76 and 74 respectively. This combined multiplier differentiator output provides a control signal to the input power amplifiers 78 and 80 respectively so as to provide a varying flux level to the windings 68 and 66 of electro-magnets 22 and 20 to maintain a predetermined length $l$.

Each vehicle wheel 30, of the preferred embodiment, has an associated electrical system as shown in FIG. 4. It should be obvious, however, that a varying number of the system of FIG. 4 can be utilized depending on the required dampening and the type of suspension systems and is therefore not limited to or required to have one such system for each wheel as shown.

When no dampening is required, the vehicle suspension means 18 positions the electro-magnets 20 and 22 and their associated ferro-magnetic member 32 so as to provide the preselected gap $l$ between the upper magnet and the ferro-magnetic member so that no magnet energizing power is required. Generally the spacing between the lower magnet and the ferro-magnetic member will be equal to the gap length $l$. Unequal distances between the magnets and the interposed ferro-magnetic member may be utilized and will not change the concepts of the invention.

The vehicle accelerometer 24 will produce a positive voltage output signal corresponding to the acceleration of the change in $l$ caused by movement of the sprung portion 10. Thus compensating network 57 has a positive input and will therefore have an output. This compensating network output signal is then applied to the square root circuit 70 which produces an output equivalent to the square root output signal voltage is then applied to parallel differentiator 74 and one input of multiplier 64. The other input of multiplier 64 is supplied from the output of position transducer 26. It should be noted that position transducer 26 has one half of its maximum output when distance $l$ is at its predetermined length. When the length $l$ either increases or decreases in length, a corresponding output signal is produced and will be of equal value but opposite direction as applies to the two multipliers for equal relative movement between the upper magnet and the ferromagnetic member. The two signals are then multiplied by multiplier 64 whose output is summed with the output of differentiator 74. The summed signal controls the output voltage level of amplifier 80 causing an increase in magnet power equivalent to that required to dampen the relating motion between the sprung and unsprung portions.

As hereinbefore stated in the example above, the output signal voltage of accelerometer 24 is positive going for upward acceleration. This signal is also fed to the input of inverter 58. This positive signal is inverted at the output of the inverter 58 resulting in a negative signal voltage at the input of compensating network 60.

As mentioned before, the compensating networks have a series diode that block any negative voltage inputs rendering the circuit inoperative as if the accelerometer had produced no output signal voltage. With the compensating network 60 inoperative, the lower magnet 22 will have no power applied and will, therefore, be inoperative It can be easily understood that if $l$ became smaller, the opposite portion of the circuit would be active and the lower magnet 22 would have power applied and the upper magnet 20 would not.

The circuits are capable of instantaneous magnet power application at various levels depending on the magnitude of the change in $l$. If the power to the circuit of FIG. 4 were interrupted for any reason, the suspension will maintain vehicle support and only the ease of ride, i.e., dampening, will be lost.

The dampening apparatus and control described herein and constructed according to the invention is relatively simple in contruction and provides superior dampening of the vertical oscillations of the suspension system of conventional vehicles traveling along a support surface so as to provide smooth ride characteristics regardless of surface irregularities.

It should be noted that although the preferred embodiment deplicts the concepts of the instant invention as applied to rail supported vehicles and for dampening in a vertical mode, the instant invention may be applied equally as successful to any vehicle having a sprung and unsprung portion and used for dampening in a horizontal mode.

Referring now to FIG. 5, a suspension system is shown comprising an air bag 19 incasing a passive spring 21. Additionally shown is a compressed gas container 23 and interconnecting pressure lines carried by the sprung portion of the vehicle to provide active control of the suspension hereinafter described. The suspension further includes a control valve 25 for maintaining the desired pressure within the air bags 19. When the air bag 19 is forced downward by an increase in the weight of the sprung portion of the vehicle, the valve actuator 27 moves from its correct position upward, opening valve 25 that allows compressed gas from container 23 to increase the pressure within air bag 19 causing it to increase in length until the actuator valve 27 returns to its former correct position and the valve 25 is again closed allowing no compressed gas to enter bag 19. When the load on the sprung portion of the vehicle is reduced, the air bag 19 elongates moving valve actuator 27 downward from its correct position causing a vent 29 in valve 25 to open allowing compressed gas to be released from air bag 19 until the valve actuator 27 again returns to its correct position. Horizontal dampening between the sprung and unsprung may be provided by a single ferromagnetic member 32 positioned between two electromagnets 20, 22. The feedback control system operates in the same manner as hereinbefore described in the vertical dampening system. Obviously, accelerometer 24 and displacement 26 measure acceleration and displacement of side movement rather than vertical movement and only one of each per axle is required as shown.

FIG. 6 shows a plurality of trucks on a single vehicle each employing apparatus of the instant invention.

The invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle magnetic dampening apparatus for dampening the displacement between the sprung and unsrpung portions of a vehicle comprising:
 a pair of electro-magnetic force field members fixedly attached to said sprung portion;
 a ferro-magnetic member carried by said unsprung portion positioned between said pair of electro-magnetic force field members and normally spaced from each of said pair of electro-magnetic force field members, between said members;
 suspension means positioned between and attached to said sprung and unsprung portions of said vehicle for suspending said sprung portion from said unsprung portion in an average spaced apart position; and
 control means responsive to a change in relative positions of said ferro-magnetic member and said electro-magnetic force field members from said average spaced apart position to a non-average spaced apart position, said control means is active to vary the energizing power of the force fields of said pair of electro-magnetic force field members so as to damp any vertical displacement of said unsprung portion and said control means is effective to return said ferro-magnetic member to said average spaced apart position any time the vehicle encounters a force which produces a non-equilibrium position.

2. The invention of claim 1 wherein said pair of electro-magnetic force field members have separate, selectively variable, energization means.

3. The invention of claim 1 wherein said ferro-magnetic member is laminated.

4. The invention of claim 1 wherein said suspension means comprises pressurized resilient members including associated pressure supply and regulation means.

5. The invention of claim 1 wherein said control means comprises,
 an accelerometer having an output corresponding to the acceleration of said magnetic members from a fixed reference point and
 a first and second electronic feedback circuit, one associated with each one of said pair of electro-magnetic force field members, the first circuit being directly coupled to said accelerometer output and a second circuit coupled to said accelerometer through a series inverting element.

6. The invention of claim 1 wherein said control means comprises,
 a position transducer having an output signal responsive to the magnitude of any change from said equilibrium position of said vehicle and
 a pair of feedback circuits each comprising an input compensating network with its output signal connected to a square root circuit whose output provides an input to a differentiator stage and to a first input of a multiplier stage the second input of said multiplier stage being provided from said position transducer output, respective outputs from said multiplier and said differentiator are summed and provide a control voltage input to a separate controllable power amplifier stage for providing power to a separate one of said electro-magnetic force field members.

7. The invention of claim 1 wherein said vehicle comprises a plurality of unsprung truck members having a plurality of flange wheel members associated therewith and having rolling contact with a pair of spaced apart rail support members and a weight supporting sprung portion.

8. The invention of claim 7 wherein one of said suspension members is positioned between said sprung and unsprung portions at each one of said plurality of flange wheel members and each of said suspension members has an associated control means positioned on said sprung portion.

9. The invention of claim 1 wherein said pair of electro-magnetic force fields are electro-magnets having separate, selectively variable, energization means,
 said ferro-magnetic member is laminated,
 said suspension means comprise pressurized resilient members including associated pressure supply and regulation means, and
 said control means comprises a position transducer, an accelerometer, said accelerometer is directly connected to a first compensating network and to a second compensating network through an inverting element, said first compensating network is connected to a first square rooter element, said second compensating network is connected to a second square rooter element, said first square rooter element is connected to a first input of a first multiplier and to a first differentiator, said second square rooter element is connected to a first input of a second multiplier and to a second differentiator, the second input of said first and second multiplier is connected to said position transducer, the output of said first multiplier and said first differentiator is summed to provide an input to a first controllable power amplifier, the output of said second multiplier and said second differentiator is summed to provide an input to a second controllable amplifier.

10. The invention of claim 1 wherein said displacement between the sprung and unsprung portions to be damped is vertical.

11. The invention of claim 1 wherein said displacement between the sprung and unsprung portions to be damped is horizontal.

* * * * *